United States Patent [19]
Kubodera et al.

[11] Patent Number: 4,875,065
[45] Date of Patent: Oct. 17, 1989

[54] CAMERA

[75] Inventors: Takayuki Kubodera; Shizuo Nakamura; Masanori Onizawa; Hirotaka Shiroshita, all of Tokyo; Eiichi Mochizuki, Nagano; Masao Tsujimura; Toshikatsu Atsuta, both of Tokyo; Takayoshi Morooka, Nagano, all of Japan

[73] Assignee: Kyocera Corporation, Kyoto, Japan

[21] Appl. No.: 155,316

[22] Filed: Feb. 12, 1988

[30] Foreign Application Priority Data

Feb. 13, 1987 [JP] Japan ............................. 62-20529[U]
Jul. 29, 1987 [JP] Japan ............................ 62-189173[U]

[51] Int. Cl.$^4$ ............................................. G03B 17/02
[52] U.S. Cl. ..................................... 354/82; 354/288
[58] Field of Search ................................. 354/82, 288

[56] References Cited

U.S. PATENT DOCUMENTS

| 3,017,804 | 1/1962 | Bönisch et al. ................. 354/288 X |
| 3,820,147 | 6/1974 | Feindler et al. ...................... 354/288 |
| 4,085,414 | 4/1978 | Burgarella et al. ............. 354/288 X |
| 4,736,219 | 4/1988 | Yamanaka et al. ................. 354/288 |
| 4,772,902 | 9/1988 | Inoue et al. .................... 354/288 X |

FOREIGN PATENT DOCUMENTS

10405/73 7/1984 Japan .
634510 4/1989 Japan .

Primary Examiner—Michael L. Gellner
Attorney, Agent, or Firm—Spensley Horn Jubas & Lubitz

[57] ABSTRACT

In a camera whose camera body is extended along the optical axis, the camera body has a camera body gripping recess at a position where the index, middle, ring and little fingers are placed when the operator holds the camera with the hand from below so that the operator can hold the camera stable with the hand for a long period of time.

4 Claims, 7 Drawing Sheets

CAMERA

BACKGROUND OF THE INVENTION

This invention relates to cameras, and more particularly to a camera comprising a camera body extended along the optical axis.

In developing a camera, it is essential to take into consideration its portability, operability, and economy of production in order to provide it at low cost.

A single-lens reflex camera has a fundamental configuration which has been developed as a so-called "lateral camera" in which the camera body extends across the optical axis, and has a camera body gripping part on the right-hand side thereof. However, this configuration is disadvantageous for the following reasons. The camera body is relatively low in portability when compared with a thin camera body, because the penta prism and lens barrel protrude therefrom. Furthermore, since the camera body gripping part is provided at the right-hand end of the lateral camera body, it is rather difficult to hold the camera body stable with only one hand.

On the other hand, a thin camera has been disclosed in Japanese patent application publication No. 10405/1973. The disclosed thin camera is a motion picture camera having a camera body grip on the bottom. Therefore, the camera is free from the above-described difficulty of having the camera held only on one side. However, it suffers from another difficulty in that the provision of the camera body grip makes it difficult to make the camera compact. That is, the camera is low in portability and economy of production.

In the field of motion picture cameras, a flat-rectangular-box-shaped motion picture camera has been known which is obtained by removing protruding components such as the illuminating light, the lens barrel and the body grip such as that from the abovedescribed thin camera. Such a camera is excellent in portability because it has no protruding parts. However, it involves the following drawback. During the phototaking operation, the operator must hold the camera with the thumb on the bottom of the camera body and with the other three or four fingers on the top of the camera body. Accordingly, the weight of the camera is applied to the thumb which can become fatigued in a short period of time.

SUMMARY OF THE INVENTION

Accordingly, an object of this invention is to eliminate the above-described difficulties accompanying a conventional camera.

The foregoing object and other objects of the invention are achieved by provision of a camera comprising a camera body extended along the optical axis thereof, in which the camera body further comprises a recess at a position where at least one of the index, middle, ring or little fingers is placed when a person holds the camera body with the hand from below.

The nature, principle and utility of the invention will become more apparent from the following detailed description when read in conjunction with the accompanying drawings.

BRIEF DESCRIPTION OF THE DRAWINGS

In the accompanying drawings.

The parts (a), (b) and (c) of FIG. 1 illustrate, respectively, a perspective view, a front view and a side view showing a first example of a camera according to the present invention which camera is held with the right hand from below.

Figure 1A:
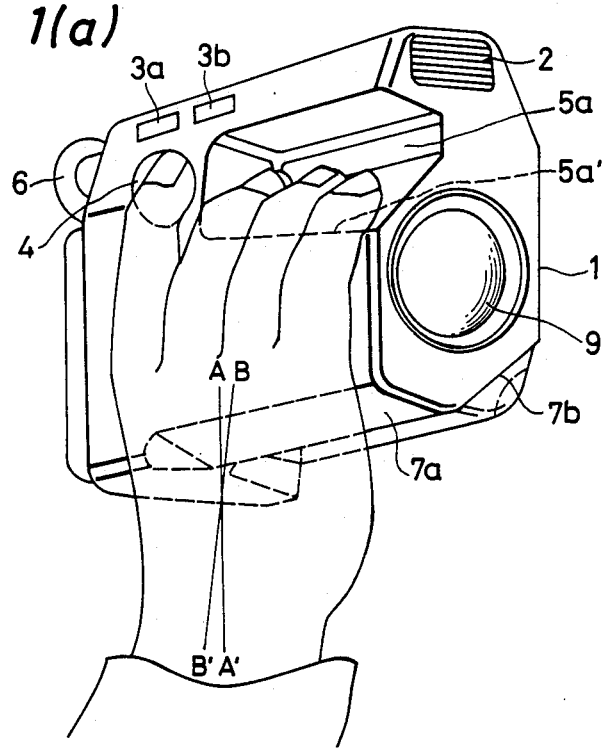
Figure 1B:
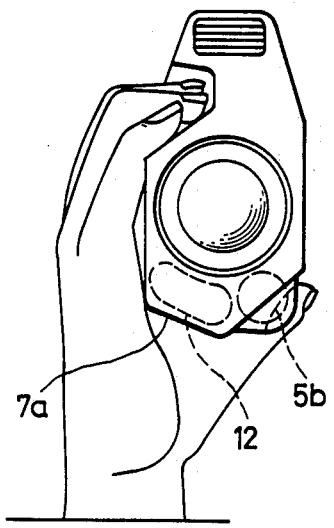
Figure 1C:
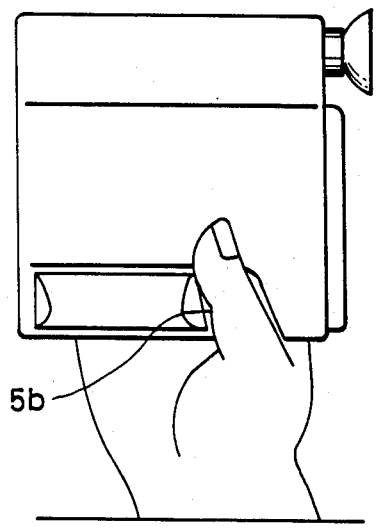
Figure 4A:
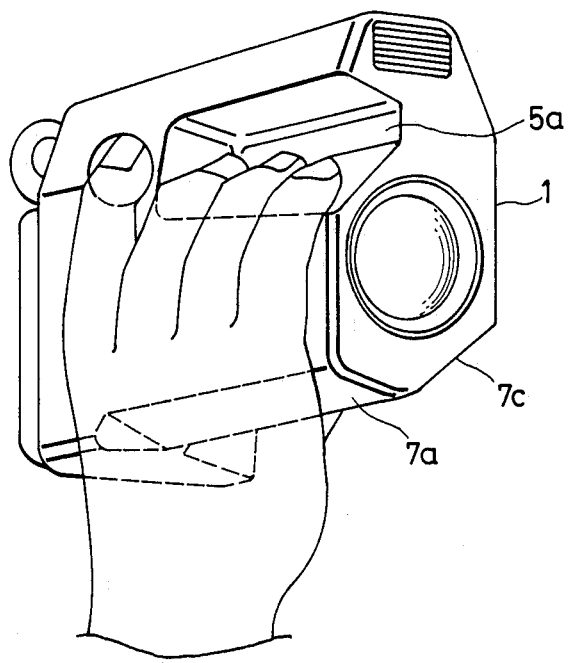
Figure 4B:
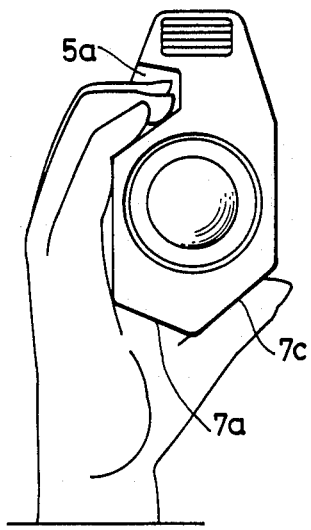
Figure 4C:
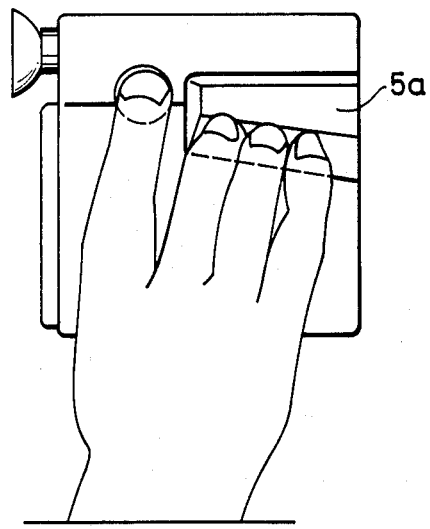

The parts (a), (b) and (c) of FIG. 4 illustrate, respectively, a perspective view, a front view and a side view of the camera of FIG. 1 in which the thumb receiving recess has been modified into a bottom left inclined surface.

Figure 5A:
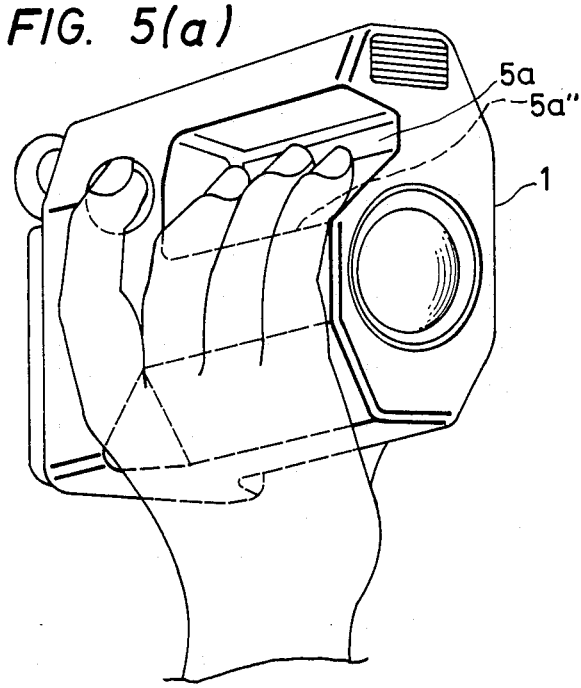
Figure 5B:
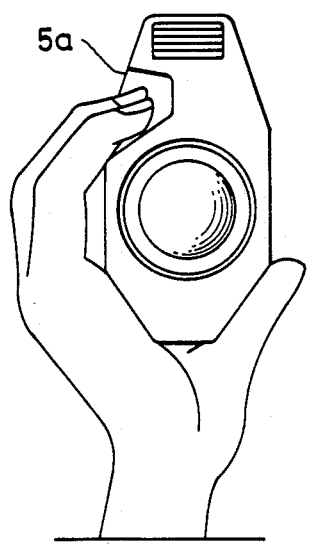
Figure 5C:
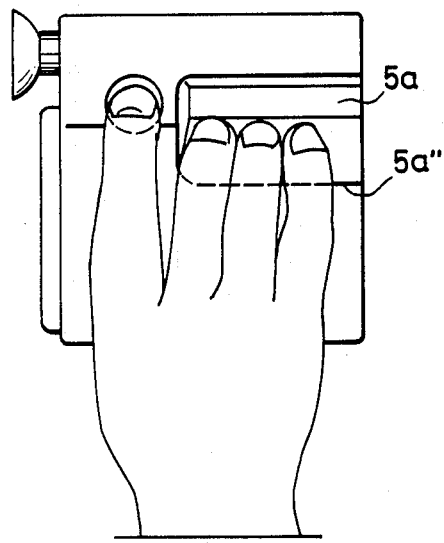

The parts (a), (b) and (c) of FIG. 5 illustrate, respectively, a perspective view, a front view and a side view of the camera of FIG. 1 in which the edge line of the camera body gripping recess has been changed into a parallel edge line.

Figure 6:
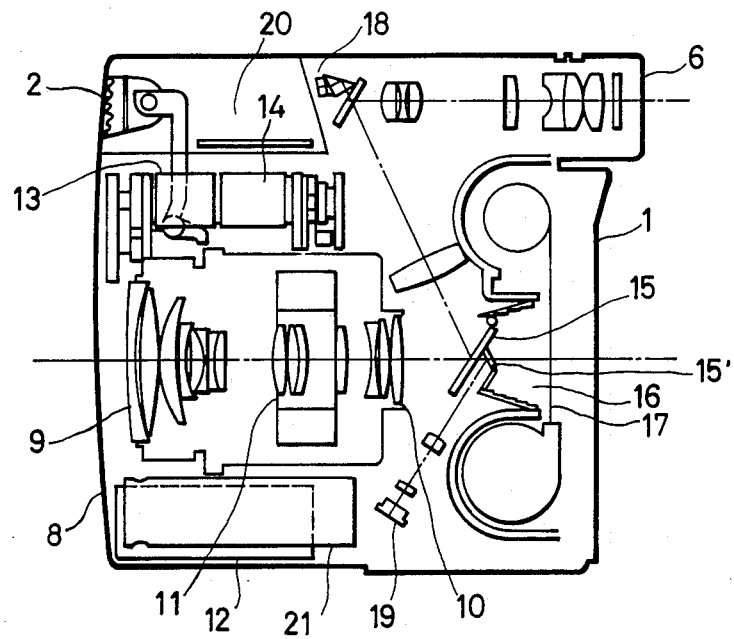

FIG. 6 is an explanatory diagram showing the arrangement of essential components of the camera of FIG. 1.

Figure 7:
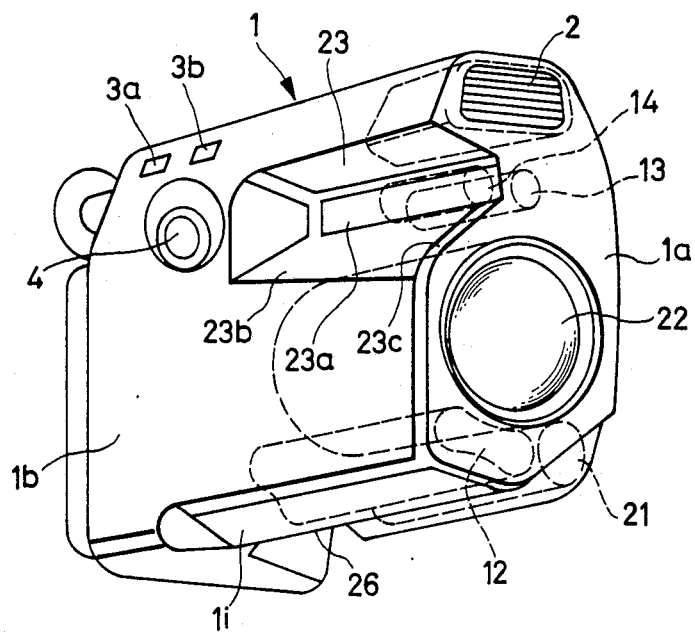

FIG. 7 is a perspective view illustrating a second example of the camera according to the present invention.

Figure 8:
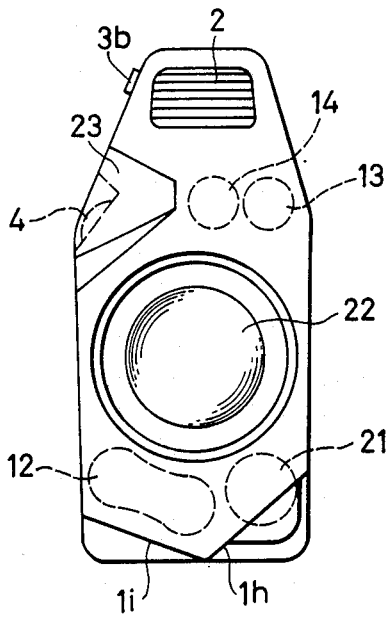

FIG. 8 is a front view of the camera of FIG. 7.

Figure 9:
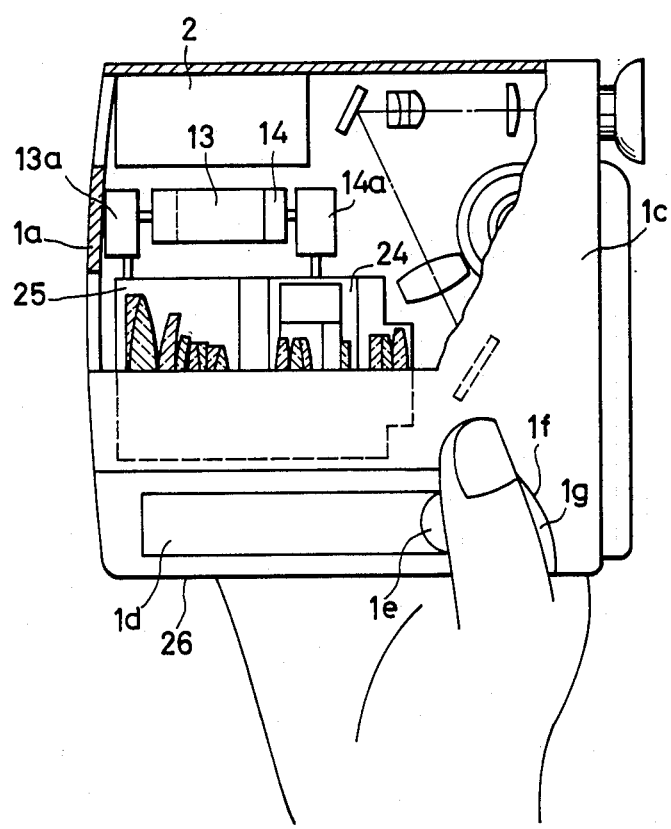

FIG. 9 is a cut away side view of the camera of FIG. 7.

Figure 10:
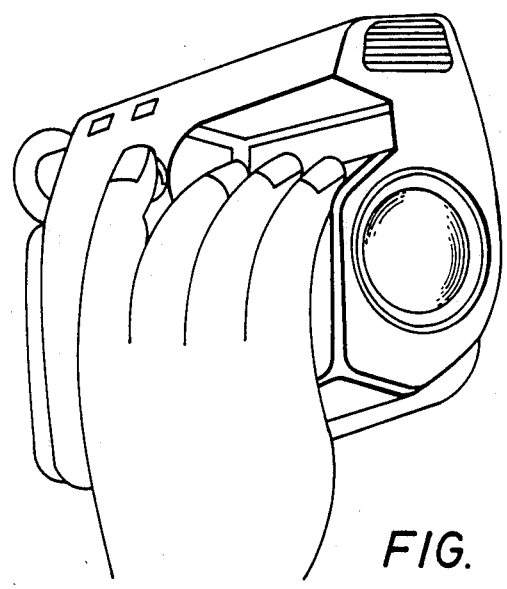

FIG. 10 is a perspective view illustrating the camera of FIG. 7 being held with a hand.

Figure 11:
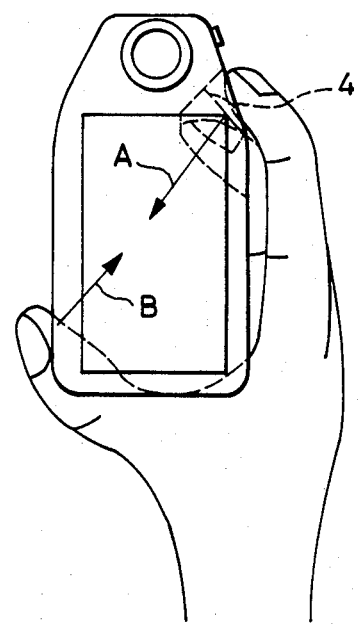

FIG. 11 is a rear view of the camera of FIG. 7.

DETAILED DESCRIPTION OF THE INVENTION

The invention will be described with reference to its preferred embodiments shown in the accompanying drawings.

A first example of a camera according to the present invention is as shown in FIGS. 1 through 6.

In the part (a) of FIG. 1, reference numeral 1 designates a camera body which is extended along the optical axis of the camera; 2, the flashing window of an electronic flash; 3a, a power zoom wide-button; 3b, a power zoom tele-button; 4, a shutter button which is generally operated with the index finger; and 5a, a gripping recess. The gripping recess 5a is formed in the camera body in such a manner that when, as shown in the part (a) of FIG. 1, the camera body is held with the right hand, the tips of the middle, ring and little fingers are placed in the recess 5a so that the camera body can be positively gripped with the right hand. More specifically, the surface touched by the fingertips is inclined towards the front of the camera body, and accordingly the lower edge line 5a' of the gripping recess 5a is extended obliquely downwardly.

Further in the part (a) of FIG. 1, reference numeral 6 designates a finder; and 7a, a bottom right-inclined surface of the camera body which is so shaped that the palm, especially the part of the palm which is located between the thumb and the index finger, can snugly fit it. A battery such as a lithium cell is generally loaded inside the bottom right-inclined surface 7a. The camera body 1 further comprises a front left-inclined part 7b which is formed to improve the external appearance of the camera body. In the part (a) of FIG. 1, reference numeral 9 designates a photographic lens.

In the part (b) of FIG. 1, reference character 5b designates a thumb receiving recess; and 12, a battery such as a lithium battery. The thumb receiving recess 5b is also shown in part (c) of FIG. 1.

The camera body shown in FIGS. 1 through 5 is designed so that it is held mainly by the right hand and auxiliarily by the left hand. However, it goes without saying that a camera body may be formed which is axially symmetrical with that which is shown in FIGS. 1 through 5, so that it is held mainly by the left hand and auxiliarily by the right hand.

FIG. 6 shows one example of the internal arrangement of the camera. In FIG. 6, reference numeral 1 designates the camera body; 2, the flashing window of the electronic flash; 6, the finder; 8, a lens barrel; 9, the photographic lens; 10, a lens barrel engaging part which is fitted in the camera body; 11, the shutter; 12, the battery; 13, an automatic focus driver; 14, a power zoom driver; 15, a mirrow; 16, a dark box forming a film chamber; 17, a photographic film; 18, a photometric section; 19, a distance measuring section; 20, an electronic flash section; and 21, a capacitor for the electronic flash. The shutter button 4 may be provided on the camera body at the position where the thumb is placed.

Now, a method of holding the camera will be described.

In the case of FIG. 1, the camera body 1 is held with the right hand in such a manner that the camera body is gripped with the thumb in the thumb receiving recess 5b and the middle, ring and little fingers in the gripping recess 5a. The index finger is used to operate the shutter button. As was described before, the lower edge line 5a' of the gripping recess 5a extends in the rear-to-front direction and is inclined downwardly. Therefore, in this case, the center line of the wrist is held generally in a direction along line B—B' in which the operator can more readily hold the elbow of his right arm at his side than if held in a direction along the line A—A' which is vertical or substantially vertical.

Figure 2:
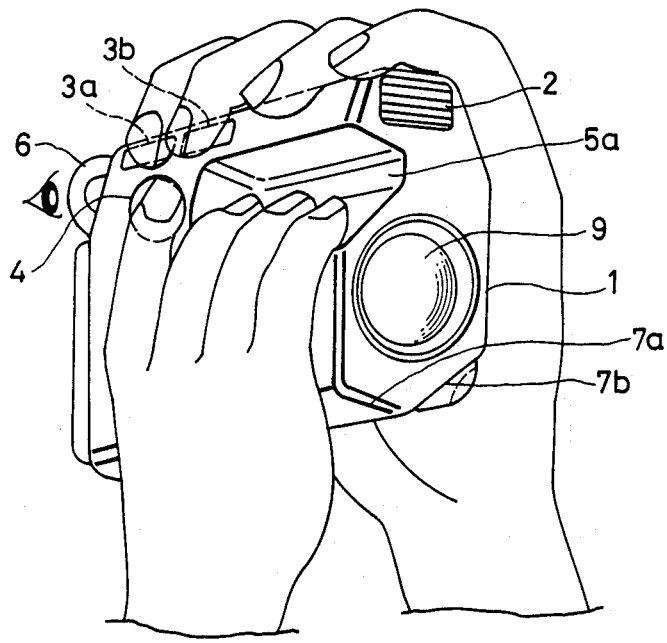
FIG. 2 illustrates a perspective view of the camera of FIG. 1 being held with both hands.
Figure 3:
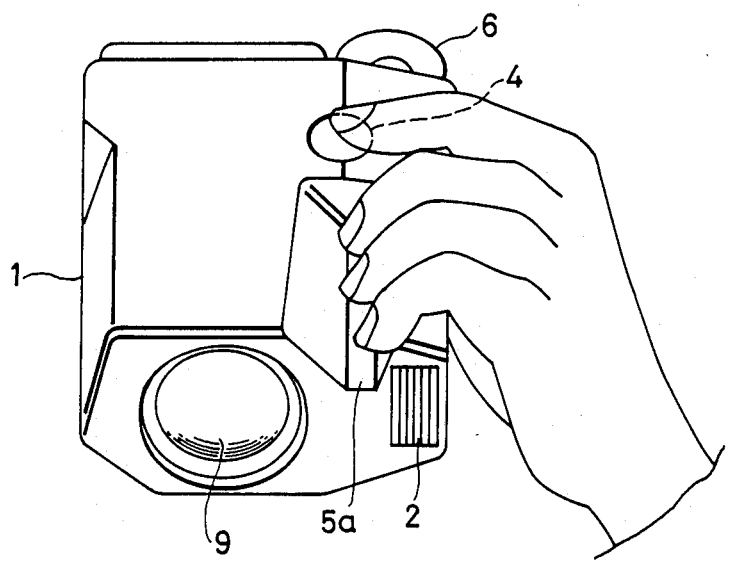
FIG. 3 illustrates a perspective view of the camera of FIG. 1 being held with both hands.

It is possible for the operator to hold the camera body and to operate the shutter button only with the right hand. However, for more stable operation, the camera may be held as shown in FIG. 2. That is, the camera is held with the left hand from above in such a manner as to cover the camera, so that the index finger and the middle finger of the left hand are used to operate the wide-button 3a and the tele-button 3b, respectively.

If the bottom of the camera of FIG. 1 were flat, the vertical central axis of the camera would coincide substantially with the central axis of the operator's wrist. Thus, his elbow would be shifted inwardly from his side, and accordingly, it would become uncomfortable for him to hold the camera with his right hand. In the camera of the present invention, this difficulty has been eliminated by the formation of the bottom right-inclined part 7a as shown in parts (a) and (b) of FIG. 1. That is, the bottom right-inclined part of the camera body allows the operator to hold his hand and arm in such a manner that the central axes of his palm, wrist and arm are substantially parallel with one another or in a straight line, as a result of which he can hold the camera with his wrist and elbow in comfort.

A second example of the camera according to the present invention will be described with reference to FIGS. 7 through 11.

As shown in FIGS. 7 through 9, a flashing window 2 through which flash light is applied to an object is formed in the front 1a of a camera body 1, and a battery 12 and a capacitor 21 which is charged by the battery for emitting flash light are provided in the bottom of the camera body 1. A lens barrel unit 22 is disposed near the battery 12 and the capacitor 21. The lens barrel unit 22 includes a zoom lens, which is retracted in the camera body when a wide-button (described later) is operated, and is extended out of the camera body when a tele-button (described later) is operated.

The aforementioned wide-button 3a and tele-button 3b are provided on the left side 1b of the camera body to move the zoom lens back and forth. A shutter button 4 for releasing (operating) the shutter is disposed below the buttons 3a and 3b. A gripping recess 23 is formed in the left side 1b of the camera body 1 in such a manner that it is extended from near the shutter button 4 to the front of the camera body. A vertical wall 23c is formed near the front of the camera body in such a manner that it is extended upwardly from the lower surface 23b of the gripping recess 23. A power zoom driver 14 and an automatic focus driver 13 are provided between the bottom 23a of the gripping access 23 and the right side 1c of the camera body 1. These drivers 14 and 13 are adapted to drive a magnifying system 24 and a focusing system 25 in an axial direction through speed reducing mechanisms 14a and 13a, respectively.

A capacitor chamber 1d for accomodating a capacitor 21 is formed in the camera body 1 in such a manner that it is extended downwardly from the lower end of the right side of the camera body. A recess 1g for receiving the thumb is formed between the end face 1e of the capacitor chamber 1d and the lower edge line 1f of the right side 1c of the camera body 1.

The camera body thus formed can be held with the hand as shown in FIGS. 10 and 11. More specifically, the camera body can be held with the thumb placed in the recess 1g on the right side 1c of the camera body and with the middle, ring and little fingers placed in the gripping recess 23. In this case, the index finger is lightly placed on the shutter button 4. In this operation, the little finger is prevented from moving over the lens because it is blocked by the vertical wall 23c. Accordingly, the index finger and the thumb, which are opened like the character "V", and the palm hold the camera body in combination, which completely eliminates the above-described difficulty of having the camera held only on its one side.

In the camera of the invention, as shown in FIG. 11, the shutter button surface is so inclined that the thick of the thumb abutted against the thumb receiving recess 1g on the right side of the camera body is generally opposite the thick of the tip of the index finger abutted against the shutter button 4. Therefore, in releasing the shutter, a force A of pushing the shutter button 4 and the force B of the thumb cancel each other out, so that the camera is prevented from being oscillated.

In the case where the camera is so designed that a 35 mm film is conveyed vertically, it is desirable that the bottoms 1i and 1h of the part of the camera body which is held with the thumb and the index finger form, for instance, angles of about 20° and about 30°, respectively, with respect to the lowermost bottom of the camera body of FIG. 8 depending on the thickness of the camera body.

It goes without saying that the bottom 1i and the line 26 formed by the bottoms 1i and 1h can be changed in configuration so as to increase the contact area of the palm and the camera body.

According to the present invention, the camera body is formed as described above. Therefore, the operator can stably grip the camera with the hand while holding the wrist and the arm naturally and comfortably.

Furthermore, the relatively heavy lens barrel unit can be held with thumb and the other fingers, while the camera body can be held with the thumb and the index finger, which are opened the like the character "V", and the palm. This completely eliminates the abovedescribed difficulty that the camera is held only on its one side.

In addition, according to the invention, the camera body has the second gripping recess so that, in releasing the shutter, the direction of the force of the thumb is generally opposite to the direction of pushing the shutter button.

What is claimed is:

1. A camera comprising a camera body extended along the optical axis thereof, in which
    said camera body has a recess at a position where at least one of the index, middle, ring and little fingers is placed when a person holds said camera body with the hand from below and in which a camera bottom, which the palm touches when a person holds said camera body with the hand from below, had an inclined surface relatively small in width on a side of said camera body.

2. A camera comprising:
    a lens barrel unit for photographing an object, said lens barrel unit being provided on the front of said camera;
    a first camera body gripping part formed in a manner to cover one side of said lens barrel unit;
    a shutter button provided adjacent to said first camera body gripping part and backwardly of said first camera body gripping part; and
    a second camera body gripping part provided in the direction of pushing said shutter button.

3. A camera as claimed in claim 2, in which said second camera body gripping part is provided in such a manner as to confront through said lens barrel unit with said first camera body gripping part.

4. A camera as claimed in claim 2, in which said first camera body gripping part is provided between said lens barrel unit and a flashing window provided in an upper portion of the front of said camera.

* * * * *